US010430679B2

United States Patent
Sezille

(10) Patent No.: US 10,430,679 B2
(45) Date of Patent: *Oct. 1, 2019

(54) METHODS AND SYSTEMS FOR DETECTING HEAD MOTION DURING AN AUTHENTICATION TRANSACTION

(71) Applicant: Daon Holdings Limited, George Town (KY)

(72) Inventor: Nicolas Jacques Jean Sezille, Dublin (IE)

(73) Assignee: DAON HOLDINGS LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,253

(22) Filed: Feb. 27, 2018

(65) Prior Publication Data

US 2018/0189584 A1    Jul. 5, 2018

Related U.S. Application Data

(63) Continuation of application No. 14/674,258, filed on Mar. 31, 2015, now Pat. No. 9,934,443.

(51) Int. Cl.

| G06F 7/04 | (2006.01) |
|---|---|
| G06F 15/16 | (2006.01) |
| G06F 17/30 | (2006.01) |
| H04L 29/06 | (2006.01) |
| G06K 9/00 | (2006.01) |

(Continued)

(52) U.S. Cl.
CPC ......... *G06K 9/00899* (2013.01); *G06F 21/32* (2013.01); *G06K 9/00221* (2013.01); *G06K 9/00228* (2013.01); *G06Q 20/40145* (2013.01); *H04L 9/3231* (2013.01); *H04L 63/0861* (2013.01); *H04L 63/10* (2013.01)

(58) Field of Classification Search
None
See application file for complete search history.

(56) References Cited

U.S. PATENT DOCUMENTS

| 8,355,530 B2 | 1/2013 | Park et al. |
| 8,508,338 B1 | 8/2013 | Fiddy |

(Continued)

OTHER PUBLICATIONS

European Search Report from EPO Application No. 16157747.3, dated Jul. 18, 2016, pp. 1-8.

*Primary Examiner* — Lynn D Feild
*Assistant Examiner* — Vadim Savenkov
(74) *Attorney, Agent, or Firm* — Kevin McDermott, Esq.

(57) ABSTRACT

A method for detecting user head motion during an authentication transaction is provided that includes generating, by a processor, a motion type feature vector and a user head motion type prediction based on data generated for a sequence of frames. The frames are included in biometric data captured from a user. Moreover, the method includes generating a liveness rating feature vector based on the generated frame data, merging the motion type and liveness rating vectors, and generating a spoof prediction from the merged vector. When the generated spoof prediction indicates biometric data in the frames was spoofed, the method includes changing the user head motion type prediction to no motion. The method also includes storing the user head motion type prediction in a buffer and determining a final user head motion type detected for the frames.

17 Claims, 10 Drawing Sheets

(51) Int. Cl.
    *G06F 21/32*     (2013.01)
    *G06Q 20/40*     (2012.01)
    *H04L 9/32*     (2006.01)

(56) References Cited

U.S. PATENT DOCUMENTS

| | | | |
|---|---|---|---|
| 8,582,835 B2 | 11/2013 | Cavallini | |
| 8,627,096 B2 | 1/2014 | Azar et al. | |
| 8,788,977 B2 | 7/2014 | Bezos | |
| 8,798,336 B2 | 8/2014 | Nechyba et al. | |
| 8,984,622 B1 | 3/2015 | Baldwin et al. | |
| 9,003,196 B2 | 4/2015 | Hoyos et al. | |
| 9,025,830 B2 | 5/2015 | Ma et al. | |
| 9,076,030 B2 | 7/2015 | Cavallini | |
| 9,082,235 B2 | 7/2015 | Lau et al. | |
| 9,117,109 B2 | 8/2015 | Nechyba et al. | |
| 9,134,804 B2 | 9/2015 | Ferren | |
| 9,137,246 B2 | 9/2015 | Parry et al. | |
| 9,153,074 B2 | 10/2015 | Zhou et al. | |
| 9,202,105 B1 | 12/2015 | Wang et al. | |
| 9,202,119 B2 | 12/2015 | Sezille | |
| 9,294,475 B2 | 3/2016 | Hoyos | |
| 9,304,583 B2 | 4/2016 | Bezos | |
| 9,305,225 B2 | 4/2016 | Ionita | |
| 9,313,200 B2 | 4/2016 | Hoyos | |
| 9,354,709 B1 | 5/2016 | Heller et al. | |
| 9,600,649 B2 | 3/2017 | Parry et al. | |
| 2008/0192980 A1 | 8/2008 | Park et al. | |
| 2009/0135188 A1 | 5/2009 | Ding et al. | |
| 2011/0001840 A1* | 1/2011 | Ishii | G02B 7/365 |
| | | | 348/222.1 |
| 2011/0188712 A1 | 8/2011 | Yoo et al. | |
| 2012/0249297 A1 | 10/2012 | Du et al. | |
| 2013/0069773 A1* | 3/2013 | Li | B60K 28/02 |
| | | | 340/426.1 |
| 2014/0015930 A1 | 1/2014 | Sengupta | |
| 2014/0270412 A1 | 9/2014 | Ma et al. | |
| 2015/0169943 A1 | 6/2015 | Khitrov et al. | |
| 2015/0195288 A1 | 7/2015 | Hoyos et al. | |
| 2015/0310259 A1 | 10/2015 | Lau et al. | |
| 2016/0049025 A1* | 2/2016 | Johnson | H04W 4/80 |
| | | | 340/5.61 |
| 2016/0057138 A1 | 2/2016 | Hoyos et al. | |
| 2016/0071111 A1 | 3/2016 | Wang et al. | |
| 2016/0140390 A1 | 5/2016 | Ghosh et al. | |
| 2016/0162729 A1 | 6/2016 | Hagen et al. | |
| 2016/0328621 A1* | 11/2016 | Negi | G06K 9/00221 |
| 2017/0193215 A1 | 7/2017 | Parry et al. | |

\* cited by examiner

METHODS AND SYSTEMS FOR DETECTING HEAD MOTION DURING AN AUTHENTICATION TRANSACTION

CROSS-REFERENCE TO RELATED APPLICATIONS

This is a continuation application of U.S. patent application Ser. No. 14/674,258, filed Mar. 31, 2015, the disclosure of which is incorporated herein by reference.

BACKGROUND OF THE INVENTION

This invention relates generally to detecting user liveness, and more particularly, to methods and systems for detecting user head motion during an authentication transaction.

Users conduct transactions with many different service providers in person and remotely over the Internet. Network-based transactions conducted over the Internet may involve purchasing items from a merchant web site or accessing confidential information from a website. Service providers that own and operate such websites typically require successfully identifying users before allowing a desired transaction to be conducted.

During remotely conducted network-based authentication transactions, users generally provide a claim of identity and captured biometric data. However, imposters have been known to impersonate users during authentication transactions by providing a false claim of identity supported by fraudulent biometric data in an effort to deceive an authenticating entity into concluding that the imposter is the person he or she claims to be. Such impersonations are known as spoofing.

Impostors currently use many methods to obtain or create fraudulent biometric data that can be submitted during authentication transactions. For facial biometric data imposters have been known to obtain two-dimensional pictures of others, from social networking sites, and present the obtained pictures to a camera during authentication to support a false claim of identity. Moreover, imposters have been known to eavesdrop on networks during legitimate network-based authentication transactions to surreptitiously obtain genuine biometric data of users, and use the obtained biometric data for playback during fraudulent authentication transactions. Such fraudulent biometric data are known to be difficult to detect using known live-ness detection techniques. Consequently, generating accurate network-based authentication transaction results with biometric data captured from a user at a remote location depends on verifying the physical presence of the user during the authentication transaction as well as accurately verifying the identity of the user based on the captured biometric data. Verifying that biometric data presented during a network-based biometric authentication transaction conducted at a remote location is from a live user at the remote location is known as live-ness detection or anti-spoofing.

BRIEF DESCRIPTION OF THE INVENTION

In one aspect, a method for detecting user head motion during an authentication transaction is provided. The method includes generating, by a processor, a motion type feature vector and a user head motion type prediction based on data generated for a sequence of frames. The frames are included in biometric data captured from a user. Moreover, the method includes generating a liveness rating feature vector based on the generated frame data, merging the motion type and liveness rating vectors, and generating a spoof prediction from the merged vector. When the generated spoof prediction indicates biometric data in the frames was spoofed, the method includes changing the user head motion type prediction to no motion. The method also includes storing the user head motion type prediction in a buffer and determining a final user head motion type detected for the frames.

In another aspect, a device for detecting user head motion during an authentication transaction is provided. The device includes a processor and a memory configured to store frame data. The device is associated with a network and the memory is coupled to the processor and has instructions stored thereon which, when executed by the processor, cause the device to perform steps including generating a motion type feature vector and a user head motion type prediction based on data generated for a sequence of frames. The frames are included in biometric data captured from a user. Moreover, the instructions, when executed by the processor, cause the device to perform steps including generating a liveness rating feature vector based on the generated frame data, merging the motion type and liveness rating vectors, and generating a spoof prediction from the merged vector. Furthermore, the instructions, when executed by the processor, cause the device to perform steps including changing the user head motion type prediction to no motion when the generated spoof prediction indicates biometric data in the frames was spoofed, storing the user head motion type prediction in a buffer in the memory, and determining a final user head motion type for the frames.

In yet another aspect, a method for detecting user head motion during an authentication transaction is provided. The method includes storing a head motion type prediction for a sequence of frames in a buffer. The buffer stores head motion type predictions for different types of motion, each head motion type prediction corresponds to the time a most recent frame in a sequence of frames was processed, and the frames include biometric data captured from a user. When biometric data for a sequence of frames is predicted to be spoofed, an initial head motion type prediction for the sequence of frames is changed to no motion before being stored. Moreover, the method includes calculating, using a processor, a score for each type of motion, and determining the type of motion corresponding to the highest score as the final user head motion type for the sequence of frames.

DETAILED DESCRIPTION OF THE INVENTION

Figure 1:
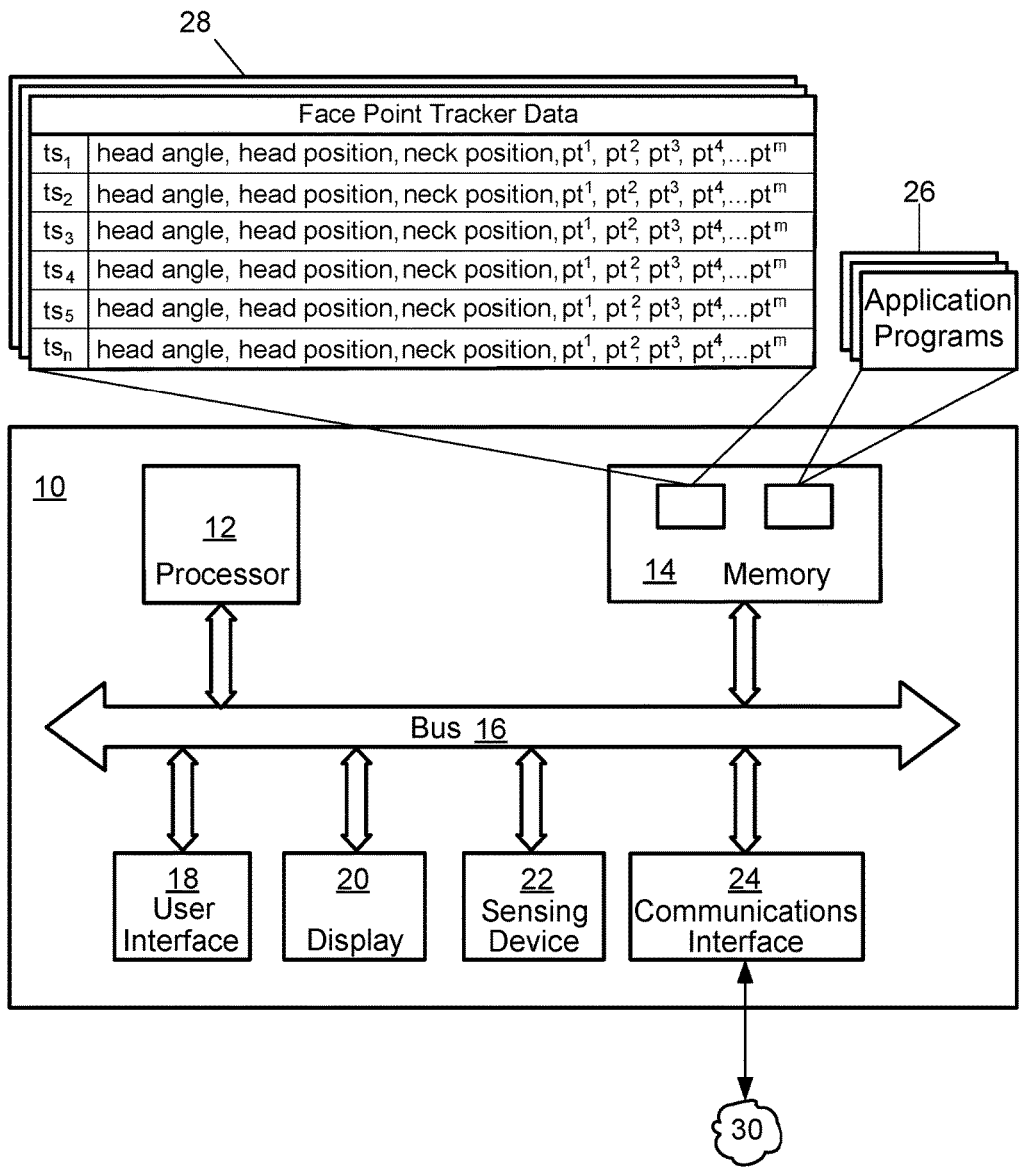
FIG. 1 is a block diagram of an exemplary terminal device used to detect user head motion during an authentication transaction.

FIG. 1 is a block diagram of an exemplary terminal device 10 used to detect user head motion during an authentication transaction. The terminal device 10 includes one or more processors 12, a memory 14, a bus 16, a user interface 18, a display 20, a sensing device 22 and a communications interface 24. The terminal device 10 may be any device capable of processing biometric data captured from users. Such devices include, but are not limited to, a smart phone, a cellular phone, a tablet computer, a phablet computer, a laptop computer, a personal computer (PC), any type of device having wired or wireless networking capabilities such as a personal digital assistant (PDA), and an authentication computer system. Moreover, the terminal device 10 may be portable or stationary and is associated with at least one user.

The processor 12 executes instructions, or computer programs, stored in the memory 14. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing the functions described herein. The above examples are exemplary only, and are thus not intended to limit in any way the definition and/or meaning of the term "processor." General communication between the components in the terminal device 10 is provided via the bus 16.

As used herein, the term "computer program" is intended to encompass an executable program that exists permanently or temporarily on any computer-readable recordable medium that causes the terminal device 10 to perform at least the functions described herein. Application programs 26, also known as applications, are computer programs stored in the memory 14. Application programs 26 include, but are not limited to, an operating system, an Internet browser application, enrollment applications, authentication applications, a face tracking application, pre-trained machine learning algorithms, motion prediction algorithms, feature vector generators, or any special computer program that manages the relationship between application software and any suitable variety of hardware that helps to make-up a computer system or computing environment. Machine learning algorithms include at least classifiers and regressors.

The memory 14 may be a computer-readable recording medium used to store data including, but not limited to, computer programs and authentication data. Authentication data is biometric data for any biometric modality desired to be used as the basis for authenticating a user. Such biometric modalities include, but are not limited to, face, finger, iris, palm, and any combination thereof.

When the biometric modality is face, the terminal device 10 may capture face biometric data as a video, extract frames from the video, and assign a time stamp to each frame in the video. The face tracker application processes the extracted frames. However, the rate at which the terminal device 10 extracts frames from the video is greater than the rate at which the face tracker application processes the extracted frames. Consequently, the face tracker application does not process all of the extracted frames. Because some frames may take more or less time to process, the frame processing rate may be regular or irregular, and may be the same or different for each authentication transaction.

Face authentication data may be stored in the memory 14 as face point tracker data 28. The face point tracker data 28 includes a time stamp ($ts_n$) assigned to each frame processed by the face tracker application and corresponding data generated by the face tracker application as a result of processing the frames. The generated data includes, but is not limited to, coordinate values for points of interest $pt^1$ to $pt^m$, user head angle data, user head position data, and user neck position data. The head position data includes estimated coordinate values for the center of a user's head and the user neck position data includes estimated coordinate values for the back of the user's neck. Signals generated from the face point tracker data 28 may be stored in the memory 14.

The points of interest $pt^1$ to $pt^m$ are identified by the face tracker application on the facial image included in each processed frame. The face tracker application calculates three dimensional coordinate values for each point $pt^1$ to $pt^m$. The points of interest $pt^1$ to $pt^m$ include, but are not limited to, cheek points, nose points, points on sides of the face, chin points, and points about the eyes and eye brows. The angle of the user's head with respect to the terminal device 10 is calculated by the face tracker application. The designation "m" as used in conjunction with the points ($pt^m$) is intended to indicate that any number "m" of points may be used that facilitates detecting user head motion as described herein.

Each frame processed by the face tracker application is assigned a number. For example, the first processed frame is assigned the number 1, the second processed frame is assigned the number 2, the third processed frame is assigned the number 3, and so on. The total number of processed frames is "n." Thus, the designation "n" as used in conjunction with the time stamps ($ts_n$) indicates that any number "n" of processed frames may be used that facilitates detecting user head motion as described herein.

The memory 14 may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the memory 14 may include smart cards, SIMs or any other medium from which a computing device can read computer programs, applications or executable instructions.

The user interface 18 and the display 20 allow interaction between a user and the terminal device 10. The display 20 may include a visual display or monitor that displays information to a user. For example, the display 20 may be a Liquid Crystal Display (LCD), active matrix display, plasma display, or cathode ray tube (CRT). The user interface 18 may include a keypad, a keyboard, a mouse, an infrared light source, a microphone, cameras, and/or speakers. Moreover, the user interface 18 and the display 20 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 10 to enter data, change settings, control functions, etc. Consequently, when the touch screen is touched, the user interface 18 communicates this change to the processor 12, and settings can be changed or user entered information can be captured and stored in the memory 14.

The sensing device 22 may include RFID components or systems for receiving information from other devices. The sensing device 22 may also include components with Bluetooth, Radio Frequency Identification (RFID), Near Field Communication (NFC), infrared, or other similar capabilities. The terminal device 10 may alternatively not include the sensing device 22.

The communications interface 24 provides the terminal device 10 with two-way data communications. Moreover, the communications interface 24 enables the terminal device 10 to conduct wireless communications such as cellular telephone calls and to wirelessly access the Internet over a network 30. By way of example, the communications interface 24 may be a digital subscriber line (DSL) card or modem, an integrated services digital network (ISDN) card, a cable modem, or a telephone modem to provide a data communication connection to a corresponding type of telephone line. As another example, the communications interface 24 may be a local area network (LAN) card (e.g., for Ethernet™ or an Asynchronous Transfer Model (ATM) network) to provide a data communication connection to a compatible LAN. As yet another example, the communications interface 24 may be a wire or a cable connecting the terminal device 10 with a LAN, or with accessories such as biometric capture devices. Further, the communications interface 24 may include peripheral interface devices, such as a Universal Serial Bus (USB) interface, a PCMCIA (Personal Computer Memory Card International Association) interface, and the like. Thus, it should be understood that the communications interface 24 may enable the terminal device 10 to conduct any type of wireless or wired communications such as, but not limited to, accessing the Internet over the network 30. Although the terminal device 10 includes a single communications interface 24, the terminal device 10 may alternatively include multiple communications interfaces 24.

The communications interface 24 also allows the exchange of information across networks such as communications network 30. The exchange of information may involve the transmission of radio frequency (RF) signals through an antenna (not shown). Moreover, the exchange of information may be between the terminal device 10 and between any other systems (not shown) and devices (not shown) capable of communicating over the communications network 30. Such other systems (not shown) include, but are not limited to, authentication computer systems and service provider computer systems. Such other devices (not shown) include, but are not limited to, smart phones, tablet computers, laptop computers, phablet computers, personal computers and cellular phones.

The communications network 30 is a 4G communications network. Alternatively, the communications network 30 may be any wireless network including, but not limited to, 3G, Wi-Fi, Global System for Mobile (GSM), Enhanced Data for GSM Evolution (EDGE), and any combination of a LAN, a wide area network (WAN) and the Internet. The network 30 may also be any type of wired network or a combination of wired and wireless networks.

Figure 2:
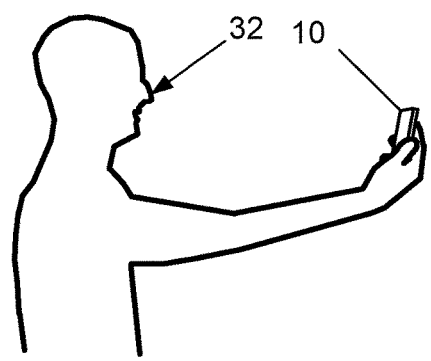
FIG. 2 is a side view of a user operating the terminal device as shown in FIG. 1.

FIG. 2 is a side view of a user 32 operating the terminal device 10 during an enrollment or an authentication transaction. Specifically, the terminal device 10 and the user 32 are positioned relative to each other such that the user may operate the terminal device 10 to capture face biometric data from his or her self. Alternatively, a person other than the user may operate the terminal device 10 while the terminal device 10 captures face biometric data from the user.

Figure 3:
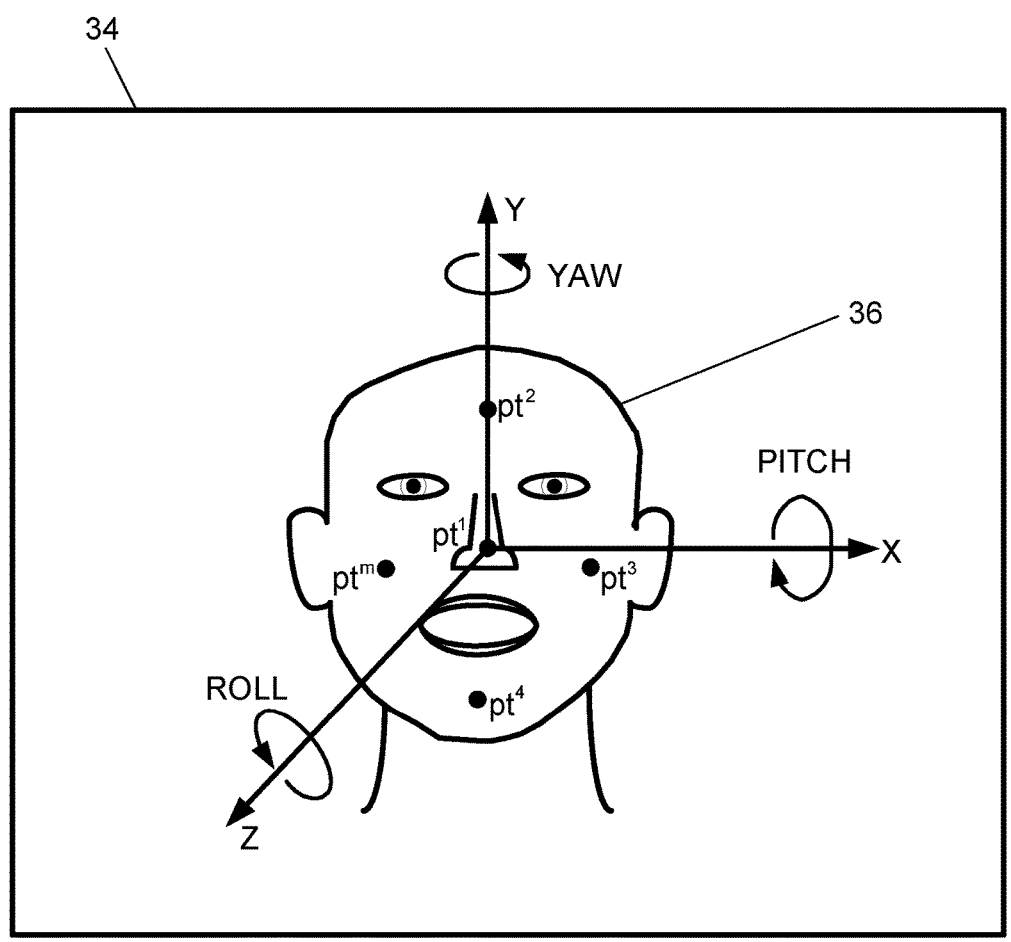
FIG. 3 is an exemplary frame as captured by the terminal device and processed by a face tracker application.

FIG. 3 is an exemplary frame 34 captured by the terminal device 10 and processed by the face tracker application. The frame 34 includes a facial image 36 of the user with points of interest $pt^1$ to $pt^m$ and a three-dimensional Cartesian coordinate system superimposed thereon. The Cartesian coordinate system has X, Y, and Z-axes and is positioned such that the origin is coincident with the tip of the user's nose. Alternatively, the origin may be positioned at any location on the facial image 36. Rotation of the image 36 about the Y-axis is called yaw, rotation of the image 36 about the Z-axis is called roll, and rotation of the image 36 about the X-axis is called pitch. Points $pt^1$ to $pt^m$, as well as any other points calculated or estimated for each frame processed by the face tracker application, may be used to generate signals. A signal that represents rotation of the head about the Y-axis is referred to as a yaw signal, a signal that represents rotation of the head about the X-axis is referred to as a pitch signal, and a signal that represents rotation of the head about the Z-axis is referred to as a roll signal.

Figure 4:
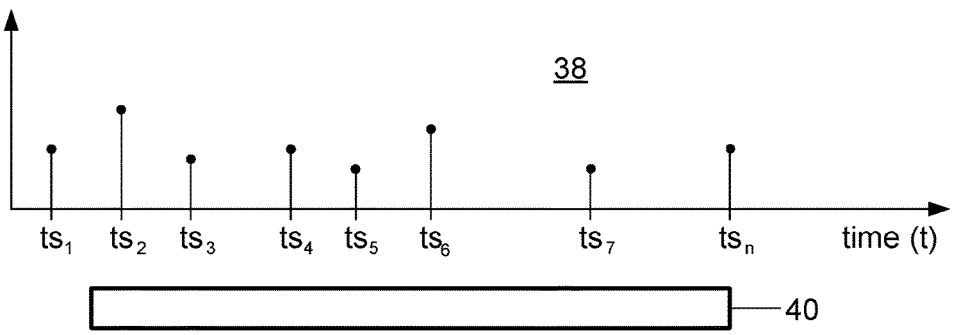
FIG. 4 is a diagram illustrating an exemplary signal and temporal window.

FIG. 4 is a diagram illustrating an exemplary signal 38 and a temporal window 40. The signal 38 is for the neck point of the user and is generated from the X-coordinate value of the neck point from each processed frame. The X-coordinate value for each processed frame is associated with the time corresponding to the time stamp assigned to the respective frame.

The temporal window 40 represents a half second of time and extends back in time from the time stamp $ts_n$, for frame number "n", such that seven (7) coordinate values are within the temporal window 40. The seven coordinate values are for frame numbers 2 to "n," and each coordinate value corresponds to a frame number. Frame numbers 2 to "n" constitute a sequence of frames processed within the temporal window 40. It should be understood that the sequence of frames processed within the temporal window 40 varies according to the face tracker application frame processing rate. Accordingly, the number of coordinate values within the temporal window 40 also varies, and may be more or less than seven. Moreover, because the frame processing rate is typically irregular, the X-coordinate values may not occur at regular intervals over time.

Feature values calculated from the signal 38 are processed by pre-trained machine learning algorithms that require regularly sampled data, for example, at a rate of sixteen frames per second. However, the signal 38 does not include coordinate values processed at a regular rate. In order to process feature values calculated from the signal 38 with the machine learning algorithms, the signal 38 should first be converted into a signal having a regular processing rate that matches the sampling rate the machine learning algorithms are tuned for. As described herein, the machine learning algorithms are tuned for a sampling rate of sixteen frames per second. Consequently, the signal 38 is converted into a signal having an effective processing rate of sixteen frames per second. The coordinate values of the signal 38 within the temporal window 40 are used to convert the signal 38 into a signal having an effective processing rate of sixteen frames per second. Although the machine learning algorithms are tuned for a sampling rate of sixteen frames per second as described herein, other algorithms tuned for different sampling rates may alternatively be used.

Figure 5:
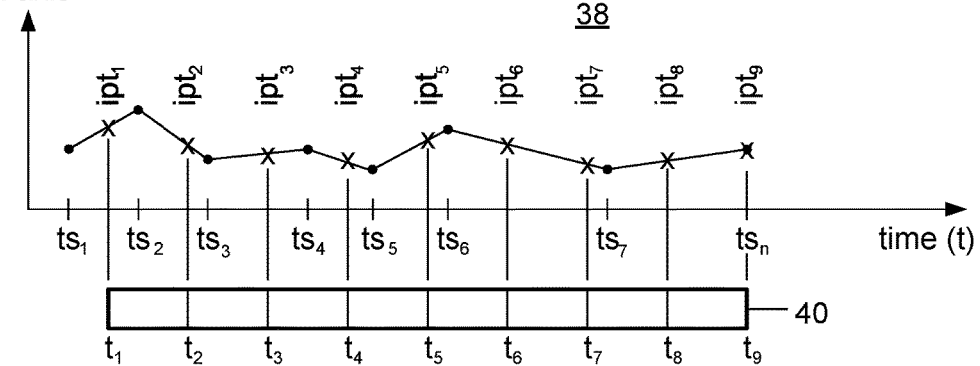
FIG. 5 is a diagram illustrating the exemplary signal and temporal window as shown in FIG. 4 further including interpolated coordinate values.

The information shown in FIG. 5 is the same information shown in FIG. 4 as described in more detail below. As such, features illustrated in FIG. 5 that are identical to features illustrated in FIG. 4 are identified using the same reference numerals used in FIG. 4.

FIG. 5 is a diagram illustrating the exemplary signal 38 and temporal window 40 as shown in FIG. 4, and further includes a line connecting each pair of sequential coordinate values and interpolated coordinate values $ipt_1$ to $ipt_9$. The temporal window 40 is divided into eight equal segments to facilitate converting the signal 38 into a signal having an effective processing rate of sixteen frames per second. Dividing the window 40 also defines times $t_1$ to $t_9$. Each of the interpolated coordinate values $ipt_1$ to $ipt_9$ corresponds to a time $t_1$ to $t_9$. For example, interpolated coordinate value $ipt_1$ corresponds to time $t_1$ and coordinate value $ipt_5$ corresponds to time $t_5$. The interpolated coordinate values are calculated from the coordinate values within the temporal window 40. For example, the coordinate value of $ipt_3$ is calculated from the X-coordinate values for frame numbers 2 and 3. Although the temporal window 40 is divided into eight segments, the temporal window 40 may alternatively be divided into any number of segments that facilitates converting the signal 38 into a signal having any desired effective frame processing rate.

Figure 6:
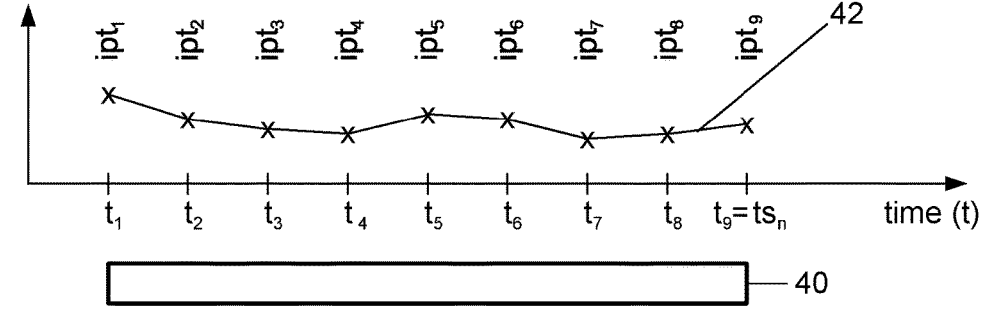
FIG. 6 is a diagram illustrating an exemplary converted signal and the temporal window.

The information shown in FIG. 6 is shown in FIG. 5 as described in more detail below. As such, features illustrated in FIG. 6 that are identical to features illustrated in FIG. 5 are identified using the same reference numerals used in FIG. 5.

FIG. 6 is a diagram illustrating an exemplary converted signal 42 and the temporal window 40. The converted signal 42 is generated from the interpolated X-coordinate values $ipt_1$ to $ipt_9$, and represents the coordinate values of the signal 38 within the temporal window 40 at an effective processing rate of sixteen frames per second. It should be understood that after the face tracker application processes a new frame a new converted signal is generated.

Figure 7:
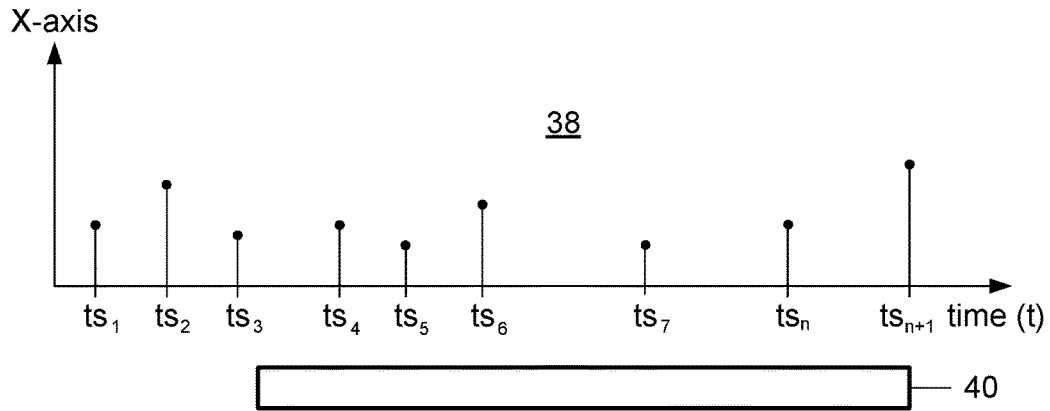
FIG. 7 is a diagram illustrating the exemplary signal and temporal window as shown in FIG. 4 further including an additional coordinate value.

The information shown in FIG. 7 is the same information shown in FIG. 4 as described in more detail below. As such, features illustrated in FIG. 7 that are identical to features illustrated in FIG. 4 are identified using the same reference numerals used in FIG. 4.

FIG. 7 is a diagram illustrating the exemplary signal 38 as shown in FIG. 4, and further includes an X-coordinate value for a newly processed frame, which is frame number "n+1." The X-coordinate value is associated with the time corresponding to the time stamp $ts_{n+1}$ assigned to the newly processed frame. The temporal window 40 is shifted to and extends back in time from the time stamp $ts_{n+1}$. Consequently, the sequence of processed frames and associated coordinate values used to generate the signal 38 shown in FIG. 7 are different than those used to generate the signal 38 as shown in FIG. 4.

Figure 8:
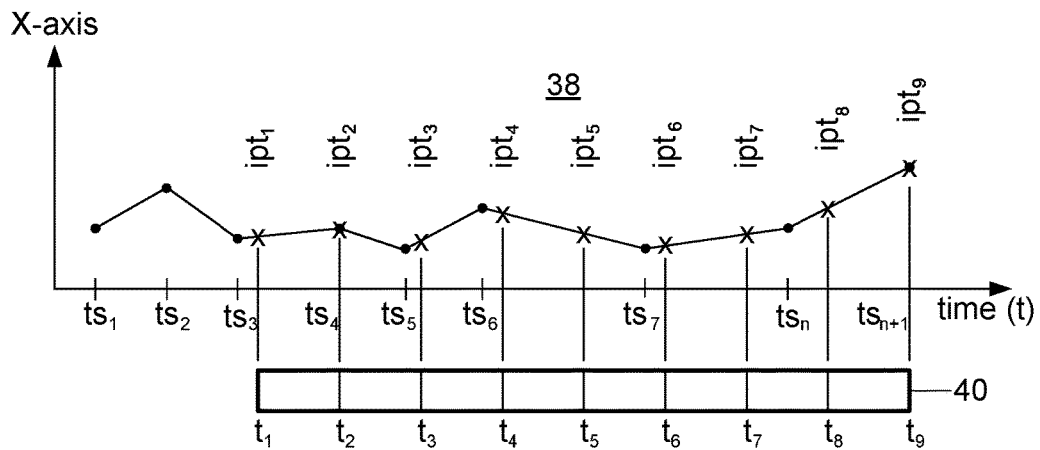
FIG. 8 is a diagram illustrating the exemplary signal and temporal window as shown in FIG. 7 further including interpolated coordinate values.

The information shown in FIG. 8 is the same information shown in FIG. 7 as described in more detail below. As such, features illustrated in FIG. 8 that are identical to features illustrated in FIG. 7 are identified using the same reference numerals used in FIG. 7.

FIG. 8 is a diagram illustrating the exemplary signal 38 as shown in FIG. 7, and further includes a line connecting each pair of sequential coordinate values. FIG. 8 also includes interpolated coordinate values $ipt_1$ to $ipt_9$. The interpolated coordinate values $ipt_1$ to $ipt_9$ are calculated in the same manner as described herein with regard to FIG. 5. Because the coordinate values of the signal 38 within the temporal window 40 are different, the interpolated X-coordinate values $ipt_1$ to $ipt_9$ are also different than those shown in FIG. 5. It should be understood that as each new X-coordinate value is added to the signal 38, the interpolated X-coordinate values within the window 40 typically change.

Figure 9:
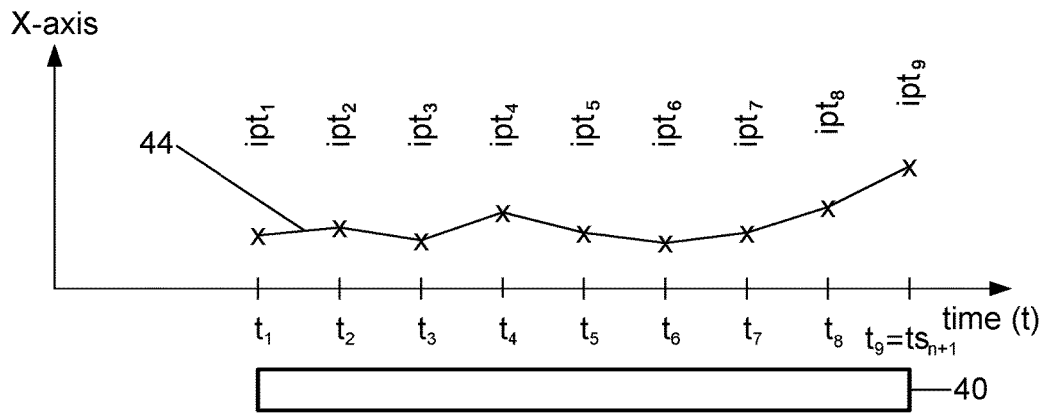
FIG. 9 is a diagram illustrating another exemplary converted signal and temporal window.

The information shown in FIG. 9 is shown in FIG. 8 as described in more detail below. As such, features illustrated in FIG. 9 that are identical to features illustrated in FIG. 8 are identified using the same reference numerals used in FIG. 8.

FIG. 9 is a diagram illustrating an exemplary new converted signal 44 and the temporal window 40. The new converted signal 44 is generated from the interpolated X-coordinate values $ipt_1$ to $ipt_9$ shown in FIG. 8, and represents the coordinate values of the signal 38 within the temporal window 40 at an effective processing rate of sixteen frames per second.

Although the signal 38 represents only X-coordinate values of the neck point, it should be understood that signals representing the Y and Z coordinate values of the neck point are likewise generated and converted into signals having an effective processing rate of sixteen frames per second. Moreover, the converted signals are combined to generate a composite converted signal that represents movement of the neck point in three dimensions. Furthermore, it should be understood that the X, Y, and Z coordinate values for all points identified by the face tracker application are likewise processed and used to generate respective composite converted signals.

Each composite converted signal is used to calculate feature values including, but not limited to, a total head rotation feature value, a total head motion feature value, correlation feature values, histogram feature values, motion predictability feature values for head angular position and head position. The generated correlation feature values are calculated as the correlation between x-axis head motion and yaw signals, and as the correlation between y-axis head motion and pitch signals. The feature values calculated from each composite converted signal are used to generate a motion type feature vector that describes movement in the biometric data captured in the sequence of frames processed within the temporal window 40. The motion type feature vectors are processed by a pre-trained machine learning algorithm to generate user head motion type predictions. Coordinate values calculated over the half second temporal window 40 constitute adequate data from which accurate user head motion type predictions may be generated. Coordinate values may alternatively be calculated over any temporal window that facilitates generating accurate head motion type predictions as described herein.

Figure 10:
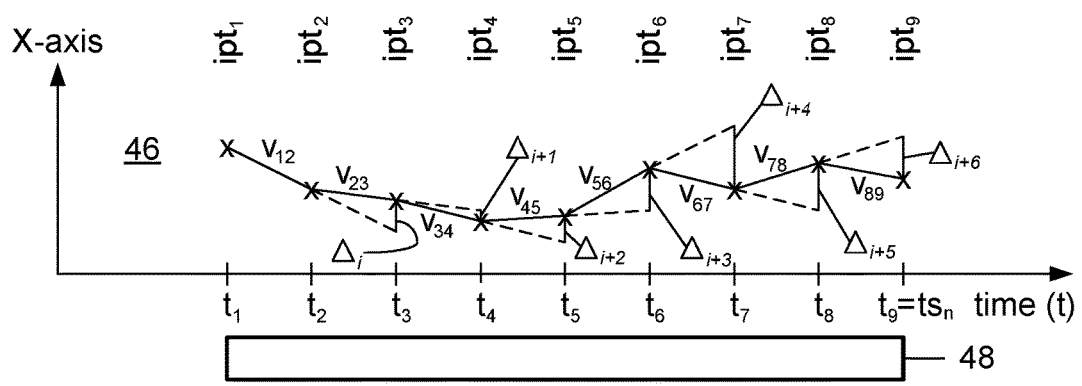
FIG. 10 is a diagram illustrating an exemplary converted signal and temporal window used for computing a motion predictability feature value.

FIG. 10 is a diagram illustrating an exemplary converted signal 46 and a temporal window 48 that are used to compute the motion predictability feature value for head position movement. The signal 46 is generated from the estimated X-coordinate values for the center of the user's head, and includes interpolated coordinate values $ipt_1$ to $ipt_9$, the velocity between sequential interpolated coordinate values, and prediction errors $\Delta_i$ to $\Delta_{i+6}$. The temporal window 48 is substantially similar to the temporal window 40.

Each segment of the signal 46 between sequential interpolated coordinate values has a slope which corresponds to the velocity V of the head position point between the values. For example, the slope between interpolation coordinate values $ipt_1$ and $ipt_2$ is $V_{12}$, the slope between coordinate values $ipt_2$ and $ipt_3$ is $V_{23}$, and the slope between coordinate values $ipt_3$ and $ipt_4$ is $V_{34}$, and so on.

The product of velocity and time is displacement. Consequently, the signal 46 may be used to calculate the displacement, or movement, of the head from a known location to a predicted location. For example, a predicted location of the head position point at time $t_3$ may be calculated by multiplying the velocity $V_{12}$ by the time between $t_2$ and $t_3$ to determine a predicted displacement, and adding the predicted displacement to the coordinate values of point $ipt_2$. The predicted location at a time is also the predicted coordinate value at that time. A prediction error $\Delta_i$ is calculated by taking the difference between the predicted coordinate value and the actual coordinate value of $ipt_3$. As another example, a predicted location of the head position point at time $t_4$ may be calculated by multiplying the velocity $V_{23}$ by the time between $t_3$ and $t_4$ to determine a predicted displacement, and adding the predicted displacement to the coordinate value of point $ipt_3$. The prediction error $\Delta_{i+1}$ is calculated by taking the difference between the predicted coordinate value and the actual coordinate value of $ipt_4$. The prediction errors $\Delta_{i+2}$, $\Delta_{i+3}$, $\Delta_{i+4}$, $\Delta_{i+5}$, and $\Delta_{i+6}$ are likewise calculated.

After calculating the prediction errors, the motion predictability feature value for head position movement for the portion of the signal 46 within the window 48 is calculated as $\Sigma_k |\Delta_k| = |\Delta_i| + |\Delta_{i+1}| + |\Delta_{i+2}| + |\Delta_{i+3}| + |\Delta_{i+4}| + |\Delta_{i+5}| + |\Delta_{i+6}|$. A composite motion predictability feature value is likewise calculated for the Y and Z coordinate values. It should be understood that the motion predictability feature value for head position movement, as well as other feature values, may be calculated in any manner that facilitates detecting user head motion as described herein.

Figure 11:
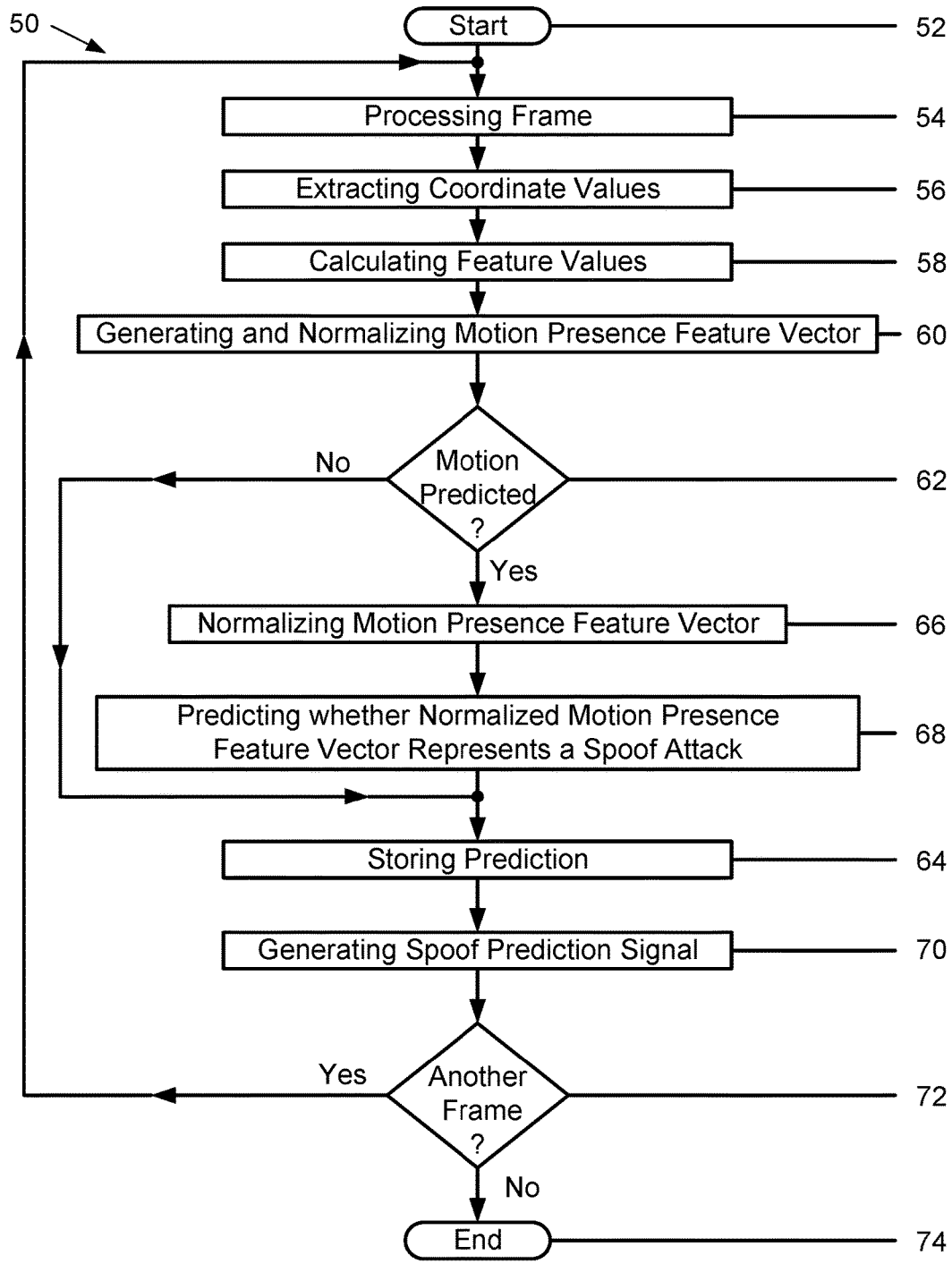
FIG. 11 is a flowchart illustrating an exemplary method for generating a motion presence feature vector and a spoof prediction signal.

FIG. 11 is a flowchart 50 illustrating an exemplary method for generating a motion presence feature vector and a spoof prediction signal. The method starts 52 by processing 54 the most recent frame included in biometric data captured from a user, and storing 54 data generated as a result of processing the frame in the memory 14. Next, processing continues by extracting 56 coordinate values for the two most recently processed frames from the memory 14. The extracted coordinate values are for all the points identified by the face tracker application. Next, processing continues by calculating 58 feature values from the extracted coordinate values. Such feature values include, but are not limited to, a step angular speed, a step motion speed, and the quantity of angular motion. The mean of magnitudes of motion vectors is also calculated for a nose point cluster, a cheek point cluster, a side point cluster, and a brow point cluster. Moreover, motion ratio feature values are calculated that include a brow/nose ratio, a cheek/nose ratio, and a side/nose ratio. These ratios are processed to calculate ratio based feature values, measures of global variation scale, and measures of specific variation. Furthermore, feature values are calculated for detecting motion behavior relationships between the head and neck of the user.

After calculating 58 the feature values, processing continues by generating 60 the motion presence feature vector from the feature values, and normalizing 60 the motion presence feature vector with a first set of pre-computed normalization parameters. Because coordinate values for the two most recently processed frames are used to generate the motion presence feature vector, the motion presence feature vector may be used to determine the presence of motion at the timestamp $ts_n$. Moreover, the motion presence feature vector may be used to determine whether biometric data in the two most recent frames was spoofed.

After normalizing 60 the motion presence feature vector, processing continues by predicting 62 whether user motion is present in the most recent frame. More specifically, the normalized motion presence feature vector is processed by a pre-trained machine learning algorithm which predicts whether motion is present. When the prediction is that motion is not present 62, an accurate spoof prediction could not be determined. Consequently, processing continues by storing 64 a spoof prediction value of zero (0) in the memory 14. Alternatively, any value may be used to indicate that motion is not predicted. When the prediction is that motion is present 62, processing continues by normalizing 66 the motion presence feature vector with a second set of pre-computed normalization parameters. The second set of normalization parameters is different than the first set.

Next, processing continues by predicting 68 whether the motion presence feature vector, normalized with the second set of parameters, represents a spoof attack. More specifically, the normalized motion presence feature vector is processed with a pre-trained machine learning algorithm which generates a spoof prediction value of positive one (+1) when the normalized motion presence feature vector is predicted to represent non-spoofed data, and a negative one (−1) when the normalized motion presence feature vector is predicted to represent spoofed data. Spoofed data is considered fraudulent while non-spoofed data is considered genuine. Alternatively, any values may be used to indicate that a normalized motion presence feature vector is predicted to represent non-spoofed data or spoofed data.

Processing continues by associating 64 the spoof prediction value with the time stamp assigned to the most recent frame, storing 64 the spoof prediction value in the memory 14, and generating 70 a spoof prediction signal. Next, processing continues by determining 72 whether another frame is to be processed. If so, processing continues by processing 54 another frame. Otherwise, processing ends 74.

Figure 12:
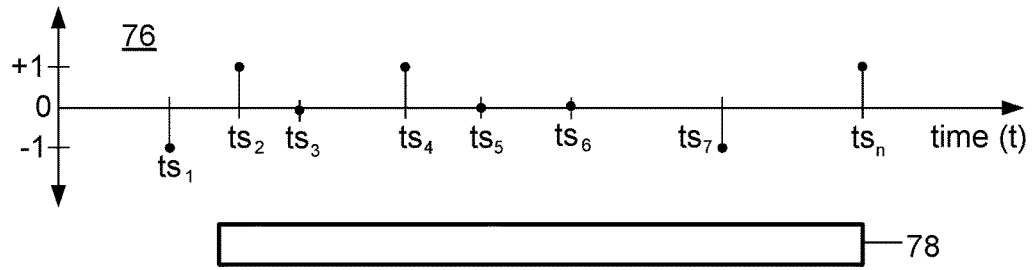
FIG. 12 is a diagram illustrating an exemplary spoof prediction signal and temporal window.

FIG. 12 is a diagram illustrating an exemplary spoof prediction signal 76 and a temporal window 78. The spoof prediction signal 76 is generated from the spoof prediction values stored in the memory 14. The spoof prediction signal 76 includes a negative one (−1) spoof prediction value for frame numbers 1 and 7, a positive one (+1) spoof prediction value for frame numbers 2, 4, and "n," and a spoof prediction value of zero (0) for frame numbers 3, 5, and 6. However, due to the face tracker application frame processing rate, the signal 76 does not have a processing rate of sixteen frames per second.

The temporal window 78 is substantially the same as the temporal window 40, begins at the time stamp $ts_n$ for frame number "n," and extends back in time for half a second. Frame number "n" is the most recently processed frame. The spoof prediction values for frame numbers 2 to "n" are within the temporal window 78, and each of the spoof prediction values corresponds to a frame number. Because the spoof prediction values are for the same sequence of frames as the coordinate values included in signal 38 as shown in FIG. 4, the sequence of frames processed within the temporal window 78 is the same as the sequence of frames processed within the temporal window 40. The spoof prediction signal 76 is also converted into a signal having an effective processing rate of sixteen frames per second.

Figure 13:
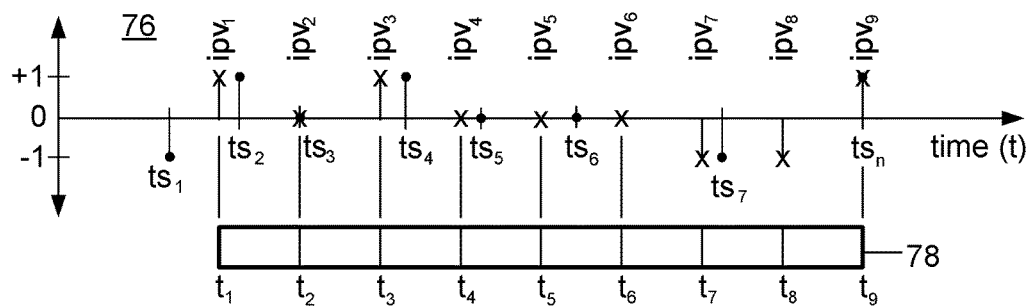
FIG. 13 is a diagram illustrating the exemplary spoof prediction signal and temporal window as shown in FIG. 12, further including interpolated prediction values.

The information shown in FIG. 13 is the same information shown in FIG. 12 as described in more detail below. As such, features illustrated in FIG. 13 that are identical to features illustrated in FIG. 12 are identified using the same reference numerals used in FIG. 12.

FIG. 13 is a diagram illustrating the exemplary spoof prediction signal 76 and temporal window 78 as shown in FIG. 12, and further includes interpolated prediction values $ipv_1$ to $ipv_9$. More specifically, the temporal window 76 is divided into eight equal segments which define nine times $t_1$ to $t_9$. Each of the interpolated prediction values $ipv_1$ to $ipv_9$ corresponds to a time $t_1$ to $t_9$ and is assigned a spoof prediction value of the nearest frame. For example, interpolated prediction value $ipv_1$ is assigned the spoof prediction value of positive one (+1) because the nearest frame, frame number 2, has a spoof prediction value of positive one (+1). As another example, the interpolated prediction value $ipv_4$ is assigned the spoof prediction value of zero (0) because the nearest frame, frame number 5, has a spoof prediction value of zero (0). The interpolated prediction values are stored in the memory 14.

Figure 14:
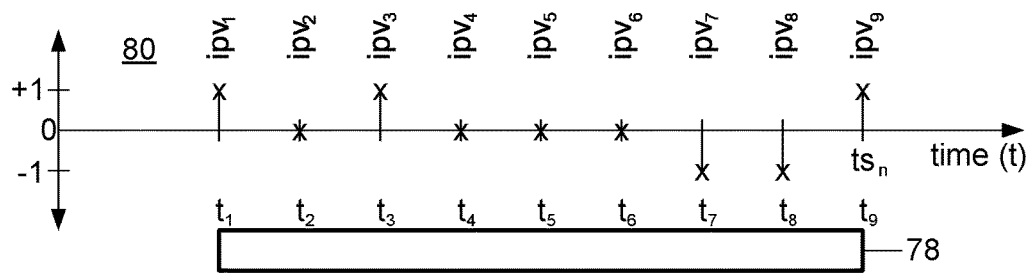
FIG. 14 is a diagram illustrating an exemplary converted spoof prediction signal and the temporal window.

The information shown in FIG. 14 is shown in FIG. 13 as described in more detail below. As such, features illustrated in FIG. 14 that are identical to features illustrated in FIG. 13 are identified using the same reference numerals used in FIG. 13.

FIG. 14 is a diagram illustrating an exemplary converted spoof prediction signal 80 and the temporal window 78. The converted spoof prediction signal 80 is generated from the interpolated prediction values $ipv_1$ to $ipv_9$, and represents spoof prediction values having an effective processing rate of sixteen frames per second.

Figure 15:
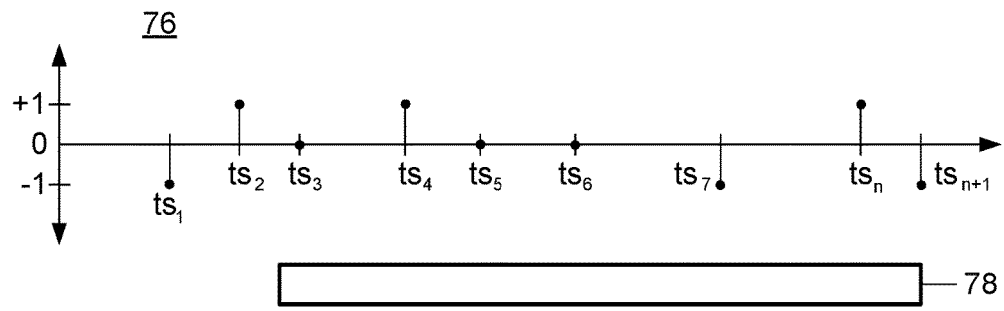
FIG. 15 is a diagram illustrating the exemplary spoof prediction signal and temporal window as shown in FIG. 12 further including an additional spoof prediction value.

The information shown in FIG. 15 is the same information shown in FIG. 12 as described in more detail below. As such, features illustrated in FIG. 15 that are identical to features illustrated in FIG. 12 are identified using the same reference numerals used in FIG. 12.

FIG. 15 is a diagram illustrating the exemplary spoof prediction signal 76 and the temporal window 78 as shown in FIG. 12, and further includes an additional spoof prediction value of negative one (−1) calculated for a newly processed frame, which is frame number "n+1." The newly processed frame is also the most recently processed frame. The temporal window 78 is shifted to and extends back in time from the time stamp $ts_{n+1}$ for frame number "n+1." Thus, the sequence of processed frames and associated spoof prediction values used to generate the spoof prediction signal 76 are different than those used to generate the spoof prediction signal 76 as shown in FIG. 12.

Figure 16:
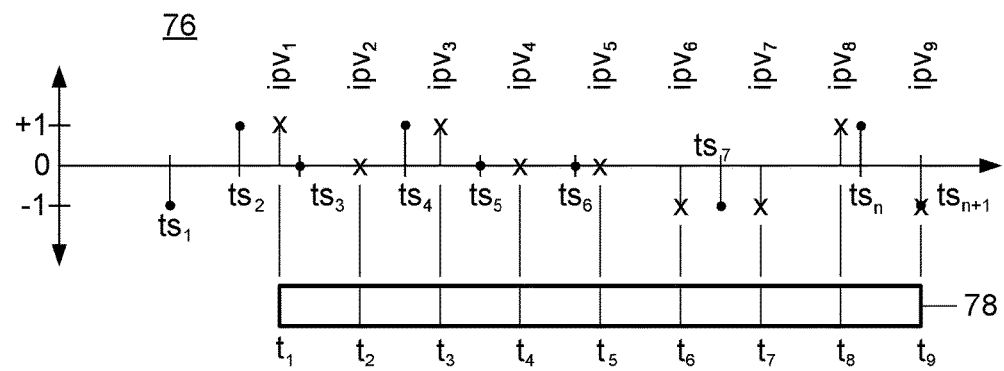
FIG. 16 is a diagram illustrating the exemplary spoof prediction signal and temporal window as shown in FIG. 15, further including interpolated prediction values.

The information shown in FIG. 16 is the same information shown in FIG. 15 as described in more detail below. As such, features illustrated in FIG. 16 that are identical to features illustrated in FIG. 15 are identified using the same reference numerals used in FIG. 15.

FIG. 16 is a diagram illustrating the exemplary spoof prediction signal 76 and temporal window 78 as shown in FIG. 15, and further includes interpolated prediction values $ipv_1$ to $ipv_9$. The interpolated prediction values $ipv_1$ to $ipv_9$ are calculated in the same manner as described herein with regard to FIG. 13. However, the interpolated prediction values for $ipv_6$, $ipv_8$, and $ipv_9$ are different. It should be understood that as each additional spoof prediction value is added to the signal 76, the interpolated prediction values calculated from the spoof prediction values within the temporal window 78 may change.

Figure 17:
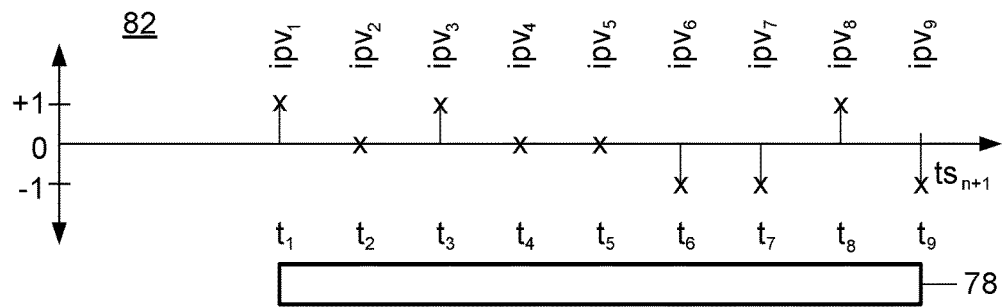
FIG. 17 is a diagram illustrating another exemplary converted spoof prediction signal and the temporal window.

The information shown in FIG. 17 is shown in FIG. 16 as described in more detail below. As such, features illustrated in FIG. 17 that are identical to features illustrated in FIG. 16 are identified using the same reference numerals used in FIG. 16.

FIG. 17 is a diagram illustrating another exemplary converted spoof prediction signal 82 and the temporal window 78. The converted spoof prediction signal 82 is generated from the interpolated prediction values $ipv_1$ to $ipv_9$, and represents spoof prediction values having an effective processing rate of sixteen frames per second. Because the converted spoof prediction signals 80, 82 are generated from the same sequence of processed frames as the converted signals 42, 44 and have an effective processing rate of sixteen frames per second, a liveness rating feature vector generated from a signal 80 or 82 may be merged with a motion type feature vector generated from the respective signal 42, 44. The merged vector may be processed by machine learning algorithms to predict whether biometric data captured in the sequence of frames within the temporal window was spoofed.

Figure 18:
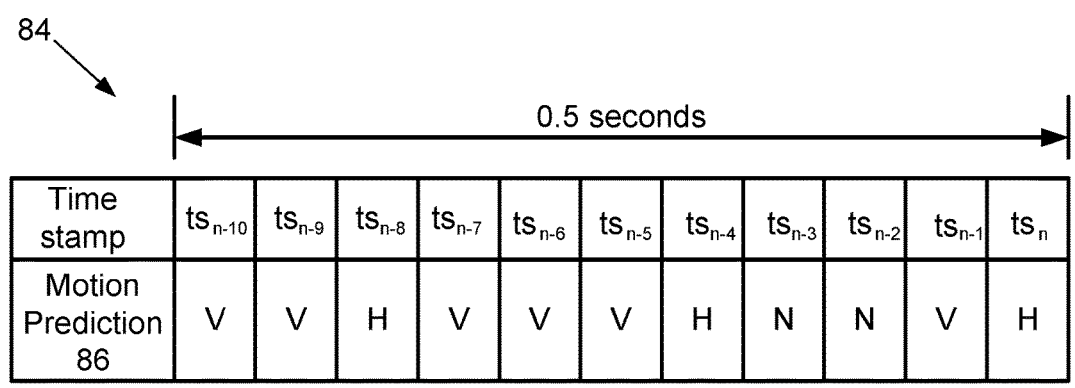
FIG. 18 is a diagram illustrating an exemplary buffer that includes time stamps and corresponding user head motion type predictions.

FIG. 18 is a diagram illustrating an exemplary buffer 84 that includes time stamps $ts_{n-10}$ to $ts_n$ and corresponding user head motion type predictions 86. The time stamps $ts_{n-10}$ to $ts_n$ correspond to the times that the eleven most recently processed frames were processed. The time stamp $ts_n$ corresponds to the most recently processed frame and time stamp $ts_{n-10}$ corresponds to the oldest processed frame. The buffer 84 extends back from the time of the time stamp $ts_n$ and has a temporal duration of half a second. However, the buffer 84 may alternatively have any temporal duration that facilitates accurately determining final user head motion types as described herein. The temporal duration of the buffer 84 is not related to the temporal windows 40, 48, and 78.

User head motion type predictions 86 may be for horizontal (H) motion, vertical (V) motion, or no (N) motion. Horizontal (H) motion indicates that the user is predicted to have rotated his head left and/or right. Vertical (V) motion indicates that the user is predicted to have nodded up and/or down. No motion (N) indicates there was no movement. The buffer 84 includes six vertical (V) motion predictions, three horizontal (H) motion predictions, and two no (N) motion predictions. Each of the predictions 86 is generated for a different sequence of frames processed within the temporal window 40. The buffer 84 may be in the terminal device 10 or in any device (not shown) or system (not shown) able to communicate with the terminal device 10 over the network 30.

All of the user head motion type predictions 86 in the buffer 84 are used to determine a final user head motion type detected for a sequence of frames processed within the temporal window 40. More specifically, a total number of predictions is calculated for each type of motion and then a score is calculated for each type of motion. The score for each type of motion is calculated as the total number of predictions for the motion type, divided by the total number of predictions in the buffer 84. Because there are six vertical (V), three horizontal (H), and two no motion (N) predictions, the scores for vertical, horizontal, and no motion are 6/11, 3/11, and 2/11, respectively. The type of motion having the highest score is determined to be the final user head motion type detected for the sequence of frames processed within the temporal window 40. Because the score for vertical motion is highest, the final user head motion type is vertical. Scores may alternatively be computed only for vertical (V) and horizontal (H) predictions. When scores for only vertical (V) and horizontal (H) motion are computed, the highest score for vertical or horizontal determines the final user head motion type. Moreover, when scores for only vertical (V) and horizontal (H) motion are computed, the final motion type is no motion (N) only when no horizontal (H) or vertical (V) predictions exist in the buffer 84.

A final user head motion type and corresponding score may be communicated to service providers and used to prove that biometric data was captured from a live user. Service providers may establish a threshold score of one-half that must be equaled or exceeded to prove a user is live. When the score calculated for a final head motion type is at least equal to the threshold score, the biometric data is considered to have been captured from a live user. When the user is also successfully authenticated, the user may be allowed to conduct a desired transaction with the service provider website. However, when the score for a final user head motion type is less than the threshold score, the biometric data is not considered to have been captured from a live user. The biometric data might contain no motion or spoofed motion. Although the example threshold score is one-half, the threshold score may alternatively be any value that a service provider believes ensures successful live-ness detection.

Although the buffer 84 includes eleven user head motion type predictions 86, it should be understood that the number of predictions 86 included in the buffer 84 may be more or less than eleven motion predictions 86 at any time.

Figure 19:
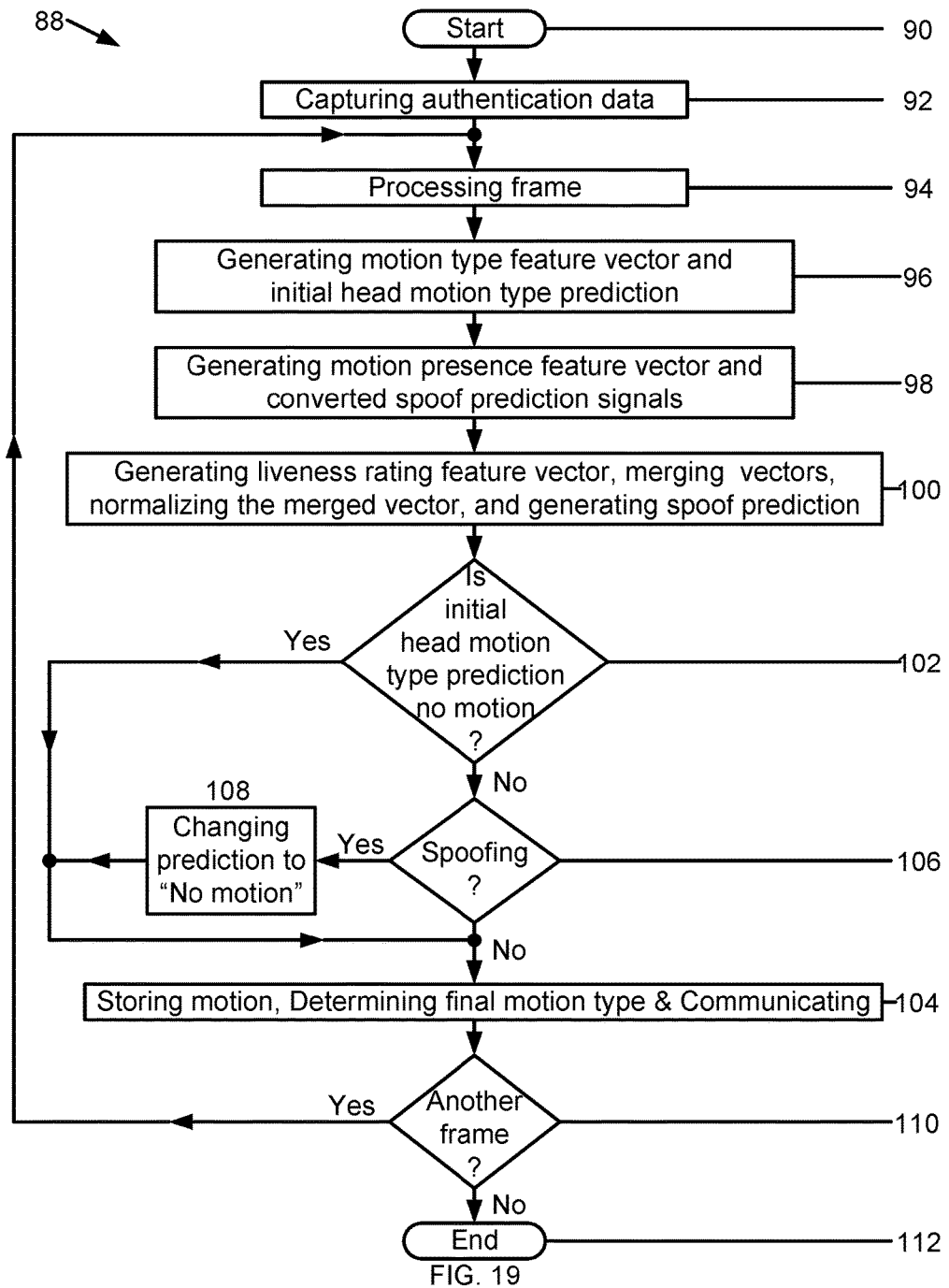
FIG. 19 is a flowchart illustrating an exemplary method for detecting user head motion during an authentication transaction.

FIG. 19 is a flowchart 88 illustrating an exemplary method for detecting user head motion during an authentication transaction. The authentication transaction is required for a user desiring to conduct a network-based transaction with a service provider website using the terminal device 10. The method starts 90 by capturing 92, as a video, face biometric data from the user with the terminal device 10, processing 94 the most recent frame in the video, and storing in the memory 14 data generated as a result of processing the frame. The most recently processed frame is assigned the time stamp $ts_n$. Prior to capturing face biometric data from the user, the user may be prompted to move his or her head during capture by an instruction that appears on the display 20. Alternatively, the user may be prompted to move his or her head during capture in any manner, for example, by another person operating the terminal device 10.

Next, the terminal device 10 continues by generating 96 a motion type feature vector, normalizing 96 the generated vector, and generating 96 a motion prediction 86 regarding the type of user head motion based on the normalized vector. The motion type feature vector is normalized 96 using pre-computed normalization parameters, and the prediction 86 regarding the type of head motion is generated by processing the normalized motion type feature vector with a pre-trained machine learning algorithm.

After generating 96 the head motion type prediction 86, processing continues by generating 98 a motion presence feature vector, generating a spoof prediction value 98 based on the motion presence feature vector, generating 98 a spoof prediction signal, and generating 98 a converted spoof prediction signal. Next, processing continues by generating 100 a liveness rating feature vector from the converted spoof prediction signal, merging 100 the motion type and liveness rating feature vectors, and normalizing 100 the merged vector using pre-computed normalization parameters. The normalization parameters applied to the merged vector are different than those applied to the motion type feature vector. The normalized merged vector is processed by a pre-trained machine learning algorithm which generates 100 a merged vector spoof prediction based on the normalized merged vector.

Next, processing continues by determining 102 whether the head motion type prediction 86 is for no (N) motion. If no (NO) motion is predicted 102, processing continues by storing 104 the head motion type prediction 86 in the buffer 84 for time stamp $ts_n$, calculating the highest motion type score for the sequence of frames processed within the temporal window 40, determining 104 a final type of user head motion, and communicating 104 the highest motion score and final user head motion type to the service provider. The highest motion score and final user head motion type may be communicated to the service provider in any manner, for example, by transmission over the network 30 to a computer system of the service provider or orally via telephone.

When no (NO) motion is not predicted 102, processing continues by determining 106 whether the merged vector spoof prediction indicated spoofing or no spoofing. When spoofing 106 is predicted, processing continues by changing 108 the head motion type prediction 86 to no (NO) motion, storing 104 the changed prediction in the buffer 84 for the time stamp $ts_n$, calculating the highest motion type score for the sequence of frames processed within the temporal window 40, determining 104 the final user head motion type, and communicating 104 the highest motion score and final user head motion type to the service provider. However, when no spoofing is predicted 106, processing continues by storing 104 the user head motion type prediction 86 in the buffer 84 for the time stamp $ts_n$, calculating the highest motion type score for the sequence of frames processed within the temporal window 40, determining 104 the final user head motion type, and communicating 104 the highest motion score and the final user head motion type to the service provider.

Next, processing continues by determining 110 whether another frame is to be processed. If so, processing continues by processing 94 another frame from the video. Otherwise, processing ends 112.

Although the head motion type prediction is changed to no (NO) motion when spoofing 106 is predicted in the exemplary method, it should be understood that in alternative methods the motion type prediction may not be changed to no (NO) motion. In such alternative methods, the head motion type prediction 86 may be adjusted according to an amount of spoofing determined to be tolerable. For example, a weighting factor reflecting the tolerance may be determined, and a weighting factor adjustment may be calculated and applied against the user head motion type prediction. When some spoofing is tolerable, the weighting factor may be set to 0.8, for example. The weighting factor adjustment is calculated by subtracting the weighting factor from one (1). Thus, for a weighting factor of 0.8, the weighting factor adjustment is 1.0−0.8=0.2. Consequently, a horizontal (H) user head motion type prediction is adjusted to 0.2 H. Instead of using a weighting factor and weighting factor adjustment to reflect the effects of spoofing, the effects of spoofing may be incorporated into the user head motion type predictions 86 in any manner.

Although the motion type feature vector is generated before the motion presence feature vector in the exemplary method, the motion presence feature vector may alternatively be generated before the motion type feature vector, or the motion type feature vector and the motion presence feature vectors may be generated simultaneously.

The methods described herein may be conducted entirely by the terminal device 10, or partly on the terminal device 10 and partly on other devices (not shown) and systems (not shown) able to communicate with the terminal device 10 over the network 30. Moreover, data described herein as being stored in the memory 14 may alternatively be stored in any system (not shown) or device (not shown) able to communicate with the terminal device 10 over the network 30.

In each embodiment, the above-described methods and systems for detecting user head motion during authentication transactions facilitate determining user live-ness during an authentication transaction conducted remotely over networks. More specifically, after processing a frame included in biometric data captured from a user, a motion type feature vector and a head motion type prediction are generated based on data generated for a sequence of frames included in the captured data. The head motion type prediction is for the time stamp assigned to the processed frame. A motion presence feature vector is also generated from the data generated for the sequence of frames. A spoof prediction signal is generated based on the motion presence feature vector and a liveness rating feature vector is generated based on the spoof prediction signal. The liveness rating feature vector is merged with the motion type feature vector, and the merged vector is processed to predict whether biometric data included in the sequence of frames was spoofed.

When the head motion type prediction is for no motion, a no (NO) motion result is stored in a buffer. However, when the head motion type prediction is for motion, the biometric data included in the sequence of frames is evaluated for spoofing. More specifically, when the prediction indicates spoofing, the head motion type prediction is changed to a no motion result which is stored in the buffer. When the prediction indicates no spoofing, the head motion type prediction is stored in the buffer. Next, a highest motion type score is calculated for the sequence of frames from data stored in the buffer, a final user head motion type for the sequence of frames is determined, and the highest motion type score and final user head motion type are communicated to a service provider. As a result, the user head motion type may be used to facilitate determining user live-ness during a remotely conducted authentication transaction, increasing the accuracy of authentication transaction results, and reducing costs incurred due to successful spoofing.

The exemplary embodiments of methods for detecting user head motion during authentication transactions described above should not be considered to imply a fixed order for performing the process steps. Rather, the process steps may be performed in any order that is practicable, including simultaneous performance of at least some steps. Moreover, the methods are not limited to use with the specific computer systems described herein, but rather, the methods can be utilized independently and separately from other computer components described herein. Furthermore, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for detecting user head motion comprising:
generating, by a computing device, a motion type feature vector and a user head motion type prediction based on data generated for a sequence of frames, the frames include an image of a biometric modality of a user;
generating a liveness rating feature vector based on the data generated for the sequence of frames;
merging the motion type and liveness rating vectors;
generating a spoof prediction from the merged vector;
changing the user head motion type prediction to no motion when the generated spoof prediction indicates the image in the frames was spoofed;
storing the user head motion type prediction in a buffer; and
determining a final user head motion type detected for the frames.

2. The method for detecting user head motion in accordance with claim 1, said generating a liveness rating feature vector step comprising:
generating a motion presence feature vector based on the generated frame data;
processing the motion presence feature vector to predict whether motion is present in the frames;
predicting whether the motion presence feature vector represents a spoof attack when motion is predicted to be present; and
storing the prediction in memory.

3. The method for detecting user head motion in accordance with claim 2, said generating a motion presence feature vector step comprising:
calculating feature values from coordinate values, the coordinate values being included in the generated frame data and being from the last two frames of the sequence; and
generating the motion presence feature vector from the calculated feature values.

4. The method for detecting user head motion in accordance with claim 1, said generating a motion type feature vector step comprising:
generating a signal based on the generated frame data, the signal having a regular processing rate that matches the sampling rate of a machine learning algorithm;
calculating feature values from a portion of the signal within a temporal window; and
generating the motion type feature vector from the calculated feature values.

5. The method for detecting user head motion in accordance with claim 4, said generating a signal step comprising:
determining coordinate values within the temporal window, the coordinate values being included in the generated frame data;

dividing the temporal window into equal segments to define times;

calculating an interpolated coordinate value for each time based on the determined coordinate values; and generating the signal from the interpolated coordinate values.

6. The method for detecting user head motion in accordance with claim 1, further comprising communicating the final user head motion type and a corresponding score to a service provider website.

7. The method for detecting user head motion in accordance with claim 1, said generating a user head motion type prediction step comprising processing the motion type feature vector with a machine learning algorithm.

8. A computing device for detecting user head motion comprising:

a processor; and a memory configured to store frame data, said computing device being associated with a network and said memory being in communication with said processor and having instructions stored thereon which, when executed by said processor, cause said computing device to perform steps comprising:

generating a motion type feature vector and a user head motion type prediction based on data generated for a sequence of frames, the frames include an image of a biometric modality of a user;

generating a liveness rating feature vector based on the data generated for the sequence of frames;

merging the motion type and liveness rating vectors;

generating a spoof prediction from the merged vector;

changing the user head motion type prediction to no motion when the generated spoof prediction indicates the image in the frames was spoofed;

storing the user head motion type prediction in a buffer in said memory; and determining a final user head motion type for the frames.

9. The computing device for detecting user head motion in accordance with claim 8, said generating a liveness rating feature vector step comprising:

generating a motion presence feature vector based on the generated frame data;

processing the motion presence feature vector to predict whether motion is present in the frames;

predicting whether the motion presence feature vector represents a spoof attack when motion is predicted to be present; and storing the prediction in said memory.

10. The computing device for detecting user head motion in accordance with claim 9, said generating a motion presence feature vector step comprising:

calculating feature values from coordinate values, the coordinate values being included in the generated frame data and being from the last two frames of the sequence; and generating the motion presence feature vector from the calculated feature values.

11. The computing device for detecting user head motion in accordance with claim 8, said generating a motion type feature vector step comprising:

generating a signal based on the generated frame data, the signal having a regular processing rate that matches the sampling rate of a machine learning algorithm;

calculating feature values from a portion of the signal within a temporal window; and generating the motion type feature vector from the calculated feature values.

12. The computing device for detecting user head motion in accordance with claim 11, said generating a signal step comprising:

determining coordinate values within the temporal window, the coordinate values being included in the generated frame data;

dividing the temporal window into equal segments to define times;

calculating an interpolated coordinate value for each time based on the determined coordinate values; and generating the signal from the interpolated coordinate values.

13. The computing device for detecting user head motion in accordance with claim 8, wherein the instructions further cause said computing device to perform steps comprising communicating the final user head motion type and a corresponding score to a service provider website.

14. The computing device for detecting user head motion in accordance with claim 8, wherein the instructions further cause said computing device to perform steps comprising processing the motion type feature vector with a machine learning algorithm.

15. A method for detecting user head motion comprising:

storing a head motion type prediction for a sequence of frames in a buffer, the buffer stores head motion type predictions for different types of motion, each head motion type prediction corresponding to the time a most recent frame in a sequence of frames was processed, the frames include an image of a biometric modality of a user, wherein when the images for a sequence of frames is predicted to be spoofed an initial head motion type prediction for the sequence of frames is changed to no motion before said storing step;

calculating, using a computing device, a score for each type of motion; and determining the type of motion corresponding to the highest score as the final user head motion type for the sequence of frames.

16. The method for detecting user head motion in accordance with claim 15 further comprising communicating the final user head motion type and the highest score to a service provider website.

17. The method for detecting user head motion in accordance with claim 15, further comprising predicting the different user head motion types to be horizontal, vertical or no motion.

* * * * *